United States Patent [19]
Sievers

[11] Patent Number: 5,914,842
[45] Date of Patent: Jun. 22, 1999

[54] ELECTROMAGNETIC COUPLING DEVICE

[75] Inventor: Carl J. Sievers, Oshkosh, Wis.

[73] Assignee: SNC Manufacturing Co., Inc., Oshkosh, Wis.

[21] Appl. No.: 08/938,725

[22] Filed: Sep. 26, 1997

[51] Int. Cl.⁶ .................................. H02H 3/00; H02J 1/00
[52] U.S. Cl. .................................. 361/42; 361/45; 363/15
[58] Field of Search .............................. 363/15; 323/305, 323/328, 332, 338, 344; 361/42, 45, 46

[56] References Cited

U.S. PATENT DOCUMENTS

| | | |
|---|---|---|
| 2,087,340 | 8/1937 | Davis . |
| 3,855,501 | 12/1974 | Agnew . |
| 4,091,431 | 5/1978 | Morris ........................................ 361/45 |
| 4,227,461 | 10/1980 | Beezley et al. .......................... 102/218 |
| 4,243,842 | 1/1981 | Gibb .................................... 179/18 FA |
| 4,356,435 | 10/1982 | Kalmanash ............................. 315/375 |
| 4,428,018 | 1/1984 | Hahn . |
| 4,456,834 | 6/1984 | Harris . |
| 4,573,098 | 2/1986 | Williston .................................. 361/42 |
| 4,816,956 | 3/1989 | Hertz et al. ............................... 361/42 |
| 5,536,978 | 7/1996 | Cooper et al. ............................ 307/89 |
| 5,594,329 | 1/1997 | Van Ettinger et al. ................... 324/96 |

*Primary Examiner*—Matthew Nguyen
*Attorney, Agent, or Firm*—Ryan Kromholz & Manion, S.C.

[57] ABSTRACT

In an electrical power supply system provided with a step-down distribution transformer connected to a power source to supply current to at least one neutral grounded load center, said power source having a conductor connected to a first primary grounding connection, said distribution transformer having a magnetic core, and a primary and a secondary winding independently mounted on said magnetic core, said secondary winding being electrically connected to a pair of output terminals and to a center-tapped neutral terminal, said terminals being connected to said load center, said primary winding being electrically connected to a pair of input terminals arranged for connection to said primary power source, one of said input terminals being further connected to a second primary grounding connection, said center-tapped neutral terminal being connected to said second primary grounding connection via a shunting conductor, an improvement comprising a current balancing transformer (CBT) having a magnetic core and a first and a second independent winding wound thereon, said current balancing transformer being located between said primary power source and said distribution transformer, said first CBT winding having one end connected to said primary power source and its opposite end being connected to the primary winding of said distribution transformer, a said second CBT winding being directly connected to said primary power source at one end and having its opposite end connected to the primary winding of said distribution transformer with the purpose of substantially eliminating stray voltage in an electrical load circuit comprising the steps of: locating a current balancing transformer (CBT) between a primary power source and a step-down distribution transformer, connecting one end of said first CBT winding to a power source and connecting the opposite end thereof to one end of said primary winding; connecting an end of said second CBT winding to said power source and also to a first primary grounding connection; connecting the opposite end of said second CBT winding to the opposite end of said primary winding; connecting said second CBT winding, said opposite end of said primary winding and said center-tapped conductor to a second primary grounding connection; and connecting opposite ends of said secondary winding and said center-tapped terminal to a secondary grounded load center to be supplied by said power source and said step-down transformer.

8 Claims, 2 Drawing Sheets

ELECTROMAGNETIC COUPLING DEVICE

BACKGROUND OF THE INVENTION

Under normal operating conditions load connections from a step-down distribution transformer supply electrical power to loads in a variety of settings such as residences, businesses, and farms. The loads are mainly machinery, lighting and other electric devices. The load circuits supplying power to the loads include both load conductors and cooperating neutral conductors. The neutral conductor is, like the load conductors, connected to the transformer but unlike the load conductors, it is also connected to a ground connection of the primary power source such as a high voltage power line.

In addition to grounded neutrals for completing load circuits, many of the loads are themselves grounded. Additional load grounding include connections to grounding electrodes, such as conductive rods driven into the earth, well casings, and water pipes feeding houses, barns or other water supply users.

In an ideal situation, load conductors supply current to an electrical "load," with the neutral conductor completing the circuit conveying the current back to the distribution transformer and its primary ground connection. But where some of the current flows through the ground connections at the loads, the current in the neutral conductor is reduced to a lesser value. The two main consequences of this occurrence are excessive magnetic fields surrounding the load and neutral conductors as well as the occurrence of stray voltage. The present invention substantially prevents current from flowing through neutral ground connections to obviate these problems.

Current will flow through the neutral grounding connections when the impedance of the neutral grounding connections drops below that of the neutral conductor's return path to power source. The voltages present upon the neutral grounding connections are said to be "stray", as they are not flowing through their intended conductors. Neutral grounding connections are desirable for safety reasons, as when a fault or short occurs in the circuit, but they are not necessary for the actual function of an electrical machine/load. Stray voltages are a known problem when humans, animals, or sensitive machinery become part of the ground circuit.

The classic case of stray voltage occurs when, for instance, a machine frame is locally grounded to the water lines of a dairy parlor. As metallic water lines offer very low resistance to current, it is probable that, should a fault occur somewhere in the grounded machine, a current will flow into the water lines. When a cow comes into contact with the piping of the dairy parlor through a water cup, or through a milking machine, some of the current may travel through the cow to true ground, i.e. the earth. This occurs where the neutral grounding connections are not connected to true ground or where the grounding is defective. This is especially likely to be a problem in areas, like barns on dairy farms, where there may be a lot of moisture.

Even where all of the loads in a particular location are properly grounded, stray voltage can occur. In this situation, stray voltage is generally from a common grounding point such as a common water pipe that is shared among a number of locations, for instance a number of power service installations in a localized area.

Past attempts at remedying stray voltage problems have included simply maintaining existing ground connectors providing common grounds for all electrical loads, providing an equi-potential plane grid underneath the flooring supporting the electrical devices connected to loads, or connecting a saturation reactor in line with one or more of the neutral conductors of the power distribution or electrical load system. U.S. Pat. No. 4,573,098 granted to Dale B. Williston on Feb. 25, 1986 teaches this latter method.

Yet another method for dealing with stray voltage was discussed in the publication entitled *Net Current Control* authored by David W. Fugate of Electric Research and Management, Inc., published Sep. 28–30, 1994, at the EPRI Magnetic Field Management Seminar in Lenox, Mass. This method is further described and claimed in U.S. Pat. No. 5,536,978 granted to Cooper, et al., on Jul. 16, 1996. The method and apparatus disclosed in the Cooper, et al., patent appears to parallel a method for reducing interference in telephone lines which utilize so-called "booster transformers." The use of "booster transformers" is described in section 873-500-100, Issue One, March, 1976, of *Principles of Prevention and Mitigation of Inductive Interference* published by Bell System Practices, AT&T.

A further related disclosure may be found in the Hertz, et al., U.S. Pat. No. 4,816,956 that defines a stray voltage apparatus having a ferromagnetic core made of a material with a particularly high initial permeability in excess of 50,000. The apparatus is located on the load side of the step-down distribution transformer.

SUMMARY OF THE INVENTION

The present invention utilizes an improved current balancing transformer (CBT) for the reduction or elimination of stray current and resultant stray voltage on a power distribution system. This is accomplished by magnetically coupling a single load conductor to a single neutral conductor on the upstream side of a step-down distribution transformer. Power is supplied through the current balancing transformer from a primary power source feeding a single load conductor and a single grounded neutral conductor. The load conductor from the primary power source is connected to an input of the distribution transformer through this first winding of the current balancing transformer. The current flowing from the primary power source travels through the primary coil of the step-down distribution transformer and returns to the primary power source through a second winding of the current balancing transformer. The first and second windings of the current balancing transformer are mounted upon a magnetic core to complete the magnetic couple between the load conductor and neutral conductor from the primary power source. Extending from the primary neutral conductor between the step-down distribution transformer and the second coil of the current balancing transformer is a distribution transformer grounding connection, which in turn is electrically connected via a grounding shunt conductor to the neutral conductor on the load side of the step-down distribution transformer. The secondary coil of the step-down distribution transformer feeds, as usual, one or more load centers or services drops, each of which are provided with a respective grounding connection.

Alternatively, the present invention may be summarily described as a method of substantially eliminating stray voltage in an electrical load circuit. The method including but not limited to the steps of locating a current balancing transformer (CBT) between a primary power source and a step-down distribution transformer; the CBT including a magnetic core and a first and a second winding wound on the core. The distribution transformer including a primary winding, a magnetic core and a secondary winding; the secondary winding having a center-tapped neutral conductor connected thereto. Connecting one end of the first CBT winding to the power source and connecting the opposite end thereof to one end of the distribution transformer primary winding. Connecting an end of the second CBT winding to the power source and also to a first primary grounding connection. Connecting the opposite end of the second CBT winding to the opposite end of the primary winding. Connecting the second CBT winding, the opposite end of the primary winding and the center-tapped conductor to a second primary grounding connection. Connecting opposite ends of the secondary winding and the center-tapped terminal to a secondary grounded load center to be supplied by the power source and the step-down transformer.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
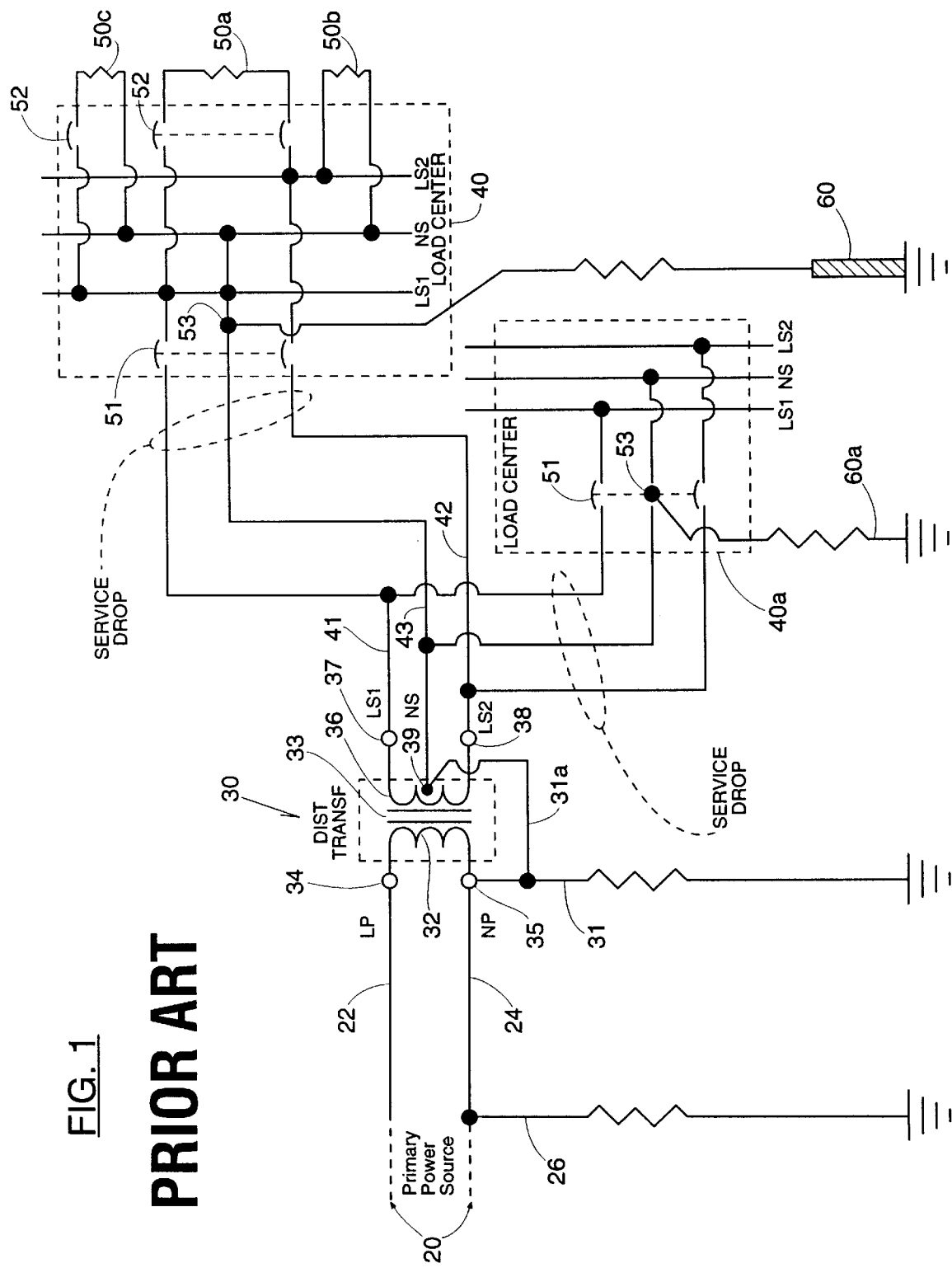
FIG. 1 is a schematic diagram of a typical prior art electrical system for providing power to a load center typical of a dairy barn operation.

Referring now to FIG. 1, there is disclosed a typical prior art distribution system for providing electricity to load centers typical of an application used in a dairy farm operation. Power from a primary power source 20 is provided to a step-down distribution transformer 30. The power provided to the step-down distribution transformer 30 by the primary power source 20 may be in the neighborhood of 7,200 volts. A conventional step-down distribution transformer 30 preferably comprises of a primary winding 32 and a secondary winding 36 wound on a ferromagnetic core 33 using conventional manufacturing techniques. The primary winding 32 has a first terminal 34 and a second terminal 35, respectively connected to a primary load conductor 22 and a primary neutral conductor 24. The primary neutral conductor is also preferably connected to a primary grounding connection 26, which may be located remotely from the step-down distribution transformer 30. Typically, the primary grounding connection 26 is an equivalent of a multiplicity of grounding connections along the line from the neutral conductor 24 to earth. In the power supply industry this is referred to as a multi-grounded neutral system. The second terminal 35 of the primary winding 32 of the step-down distribution transformer 30 is further provided with a primary grounding connection 31.

The secondary winding 36 of the step-down distribution transformer 30 has first and second load terminals 37 and 38, respectively and a center-tapped neutral terminal 39. The center-tapped neutral terminal 39 is electrically connected to the distribution transformer ground connection 31 by means of a shunt connection 31a.

The electrical system of FIG. 1 includes load centers 40 and 40a electrically connected to the step-down distribution transformer 30. These connections are made via a first load conductor 41 and a second load conductor 42 respectively connected to the first load terminal 37 and a second load terminal 38 of the step-down distribution transformer 30. Current returns to the step-down distribution transformer 30 from the load center 40 via a neutral conductor 43 electrically connected to the center-tapped neutral terminal 39 of the step-down distribution transformer 30.

The load center 40 may include one or more electrical loads 50a (typically 240 volts) and 50b or 50c (typically 120 volts), which may be any type of electrical machinery, including but not limited to a milking machine or a water pump. A breaker panel including a main circuit breaker 51 and conventional electric switching devices 52 may switch the load center 40. The switching devices 52 may comprise either single pole or double pole configuration. Neutral conductors are not switched. The electrical loads 50 are typically provided with grounded neutral connections 53. In the case of a dairy milking parlor, it is usual to ground to the cow-supporting stanchion 60 (shown schematically), to provide a secondary grounding means. Other load centers, such as load center 40a provide power to electrical pumps, lighting, feed conveyors, or other machinery. These are usually separately grounded via grounding conductors, such as conventional ground rods 60a.

Again, with reference to FIG. 1, under normal operating conditions, electricity from the step-down distribution transformer 30 supplies power to the electrical loads 50a, 50b, and/or 50c via the first and second load conductors 41 and 42. Electric current returns to the step-down distribution transformer 30 via the primary neutral conductor 43. When the impedance of each neutral grounding electrode connection 53 is lower than that of the primary neutral conductor 43, the potential for stray voltage arises. Under these circumstances, more current will flow through the neutral grounding electrode connections 53, rather than through the primary neutral conductor 43. Should a human, or animal, or a piece of sensitive equipment come into contact with the neutral grounding connections 53, while current is flowing within these connections, there is a potential that the person, animal, or machinery coming into contact with the ground may be affected by such stray voltage. In addition, because the sum total of the current flowing within the load conductors 41 and 42 minus the current in the neutral conductor 43, in this case, is not equal, an undesirable magnetic field will be present in the vicinity of the conductors 41, 42, and 43.

Figure 2:
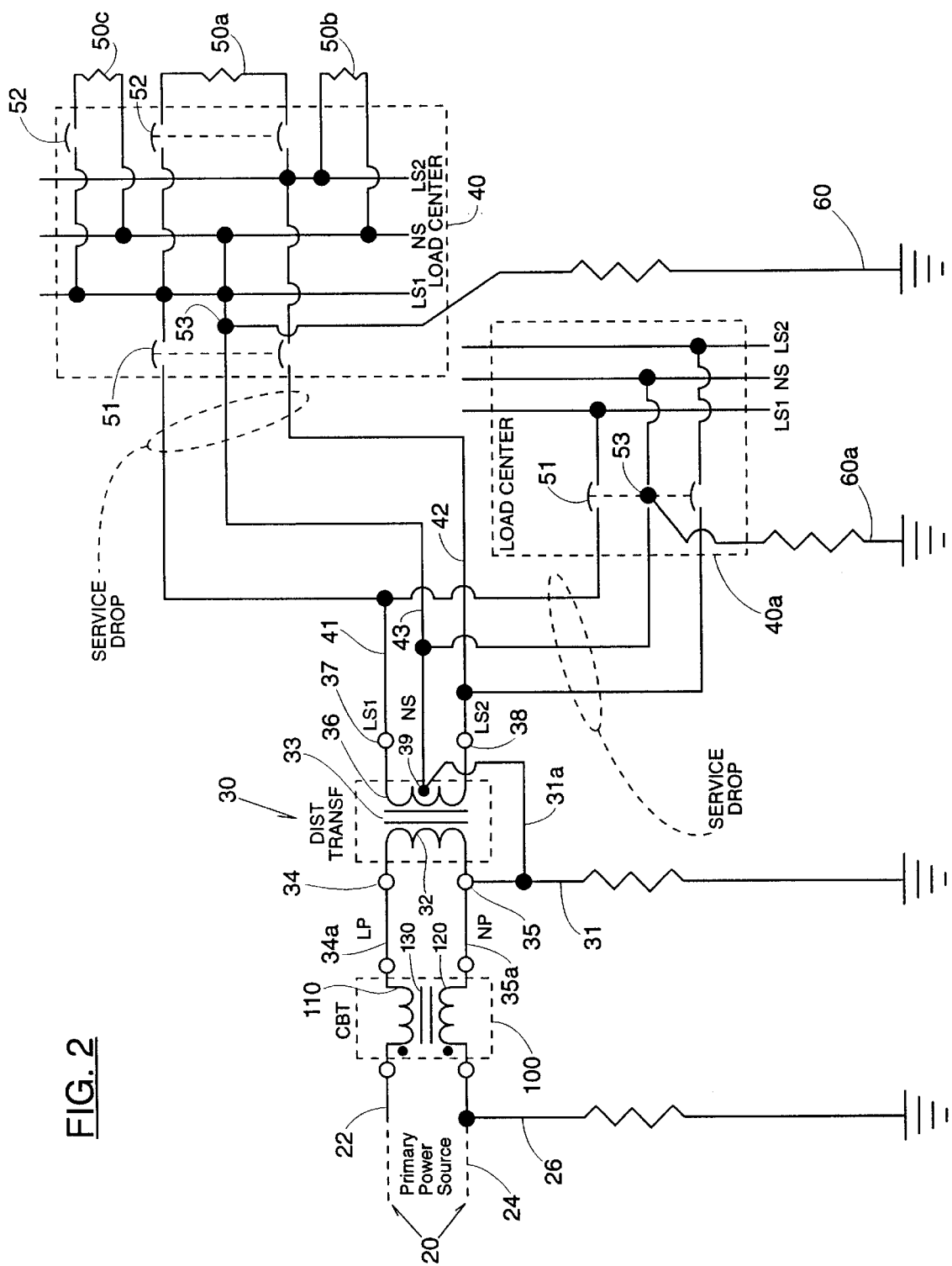
FIG. 2 is a schematic diagram of the current balancing transformer circuit as connected to an electrical system in accordance with the present invention.

With reference to the view of FIG. 2, elimination of stray voltage and unwanted magnetic fields associated with load ground connections having lower impedances than the appropriate neutral conductors, are accomplished by using a current balancing transformer 100. The current balancing transformer 100 is installed between the primary power source 20 and the step-down distribution transformer 30. It is to be noted that the current balancing transformer 100 is preferably interposed between the primary line conductor 22 and the primary neutral conductor 24, and first and second terminals 34 and 35, respectively, of the step-down distribution transformer 30.

It will be observed that identical reference characters are used to identify identical elements throughout the drawing forming a part of this description.

The current balancing transformer 100 of the improved power system of FIG. 2 is comprised of a first winding 110 disposed in series connection with the primary line conductor 22, such that current normally flowing directly from the primary power source 20 to the first terminal 34 of the primary winding 32 of the step-down distribution transformer 30 is now caused to pass through the first winding 110 of the current balancing transformer 100 and conductor 34a. The current balancing transformer 100 also has a second winding 120 that is in series connection with the primary neutral conductor 24, such that current flowing from the second terminal 35 of the primary winding 32 of the step-down distribution transformer 30 will flow through the winding 120 of the current balancing transformer 100, via conductor 35a, on its return to the primary power source 20. The first and second windings 110 and 120 of the current balancing transformer 100 are wound upon a magnetic core 130. This construction and location of the current balancing transformer 100 with respect to the primary side of the step-down distribution transformer 30 will effectively lower the impedance of the neutral conductor 35a. The arrangement will thereby constrain primary source currents that would otherwise flow to ground through the various secondary neutral grounding connections 53 as they return to the primary power source 20 through the neutral conductor 43 across the shunting grounding conductor 31a, through the second winding 120 of the current balancing transformer 100 to the primary neutral conductor 24. In addition to reducing currents flowing through the neutral grounding connections 53, the use of the Current Balancing Transformer CBT 100 provides electromagnetic field reduction as an incidental benefit as well as minimizing stray voltage. Neutral conductors 43 connected to grounding point 39 on distribution transformer 30 and neutral conductor 35a connected to grounding point 35 carry currents which are more balanced so as to cancel currents on 41 and 42 of the secondary circuit of the distribution transformer 30 and 34a of the primary source circuit. Power system electromagnetic fields are noted for inducing voltages that create noise and other voltage interference in nearby and paralleling telephone lines.

Through the use of a CBT, power utilities are able to effectively limit the on-farm stray voltage contribution from the power source 20 to a recognized acceptable level since the amount of current traveling through primary neutral conductors 24 and 35a is nearly equal to the currents flowing in primary line conductors 22 and 34a.

As stated previously, conventional transformer core and coil fabrication techniques may be used. The performance of the transformer is directly related to the properties of the materials used in its construction, and how these materials are employed in the design of the transformer. In the current balancing transformer (CBT) 100, the magnetic core material is the prime driver of performance with the physical arrangement of the two windings 110 and 120, with the winding material being a close second. To do its job the CBT needs a high open circuit inductance. This calls for a high permeability core material. It also needs a low leakage inductance, and this requires the two windings 110 and 120 to be as close as possible to each other, while maintaining the necessary high voltage insulating spacings.

In the original concept embodiment as described above, the insulation system is electrical grade paper and transformer oil. These materials are dictated by the high operating voltage and the expected service life. The winding conductor is preferably No. 14 AWG wire insulated with a polyvinyl formal coating no less than 0.0016 inches radially. Each of the two windings have 150 turns of this conductor. The core material is AISI Grade 4, grain-oriented silicon steel, 0.011 inches thick. This material is formed annealed into a distributed gap core assembly. This embodiment had a core saturation voltage of approximately 600 volts; the core saturation voltage being proportional to the number of turns.

The present invention further contemplates an improved current balancing transformer (CBT) construction. That is, one of the windings 110, 120 of the transformer 100 may be in the form of a wound ribbon of sheet copper. In this new CBT embodiment, the only change from the original design is the choice of conductors and the windings turn. The neutral winding 120 preferably has 28 turns of two No. 8 square AWG magnetic wires with a polyvinyl formal coating not less than 0.0015 inches. The high voltage, phase or line winding 110 has 28 turns of 0.005 inch thick by 6.25 inches of wide bare copper sheet with 0.007 inch thick kraft paper insulation between turns. This change was made to lower the saturation voltage and enhance the short circuit strength of the unit. The core saturation voltage in this embodiment is approximately 110 volts; it should be further noted that the core saturation voltage is proportional to the size of the transformer, the volume of the contents (as limited by the size of the transformer casing), and the type of materials used for the core and the windings as well as the number of turns.

Thus, field tests at the same farm site resulted in a reduction of cow contact voltage on the farm by a factor of 10 to 1. In the second embodiment, a 7 to 1 reduction ratio was achieved. Both of these reductions are very acceptable for the electrical utility, but since the second ribbon-type winding has the lower saturation voltage of approximately 110 volts, it is the preferred unit as far as the utility is concerned. In particular, it is well-known that core saturation voltages of less than 300 volts materially reduce concerns of electrical interference with nearby communication lines. The design and location of the ribbon-wound CBT 100 virtually eliminates the need for secondary lightning arresters and other secondary protective equipment in nearby communication circuitry. Obviously, conventional lightning and short circuit protection still must be maintained for protection of the power source 20 and step-down distribution transformer 30 and the respective circuitry.

Should an occasion arise where greater attenuation is required, conventional changes to a higher permeability core material may be made or there is the possibility of trading some of the saturation voltage for increased attenuation. Such variations are considered to be a part of the present invention as described and claimed herein.

Utility personnel using the same techniques that are used to mount typical pole-mount transformers can perform installation of the current balancing transformer 100. In it's preferred embodiments the current balancing transformer 100 is usually mounted immediately adjacent the pole-mounted step-down distribution transformer 30.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. In an electrical power supply system provided with a step-down distribution transformer connected to a primary power source to supply current to at least one neutral grounded load center, said power source having a conductor connected to a first primary grounding connection, said distribution transformer having a magnetic core, and a primary and a secondary winding independently mounted on said magnetic core, said secondary winding being electrically connected to a pair of output terminals and to a center-tapped neutral terminal, said terminals being connected to said load center, said primary winding being electrically connected to a pair of input terminals arranged for connection to said primary power source, one of said input terminals being further connected to a second primary grounding connection, said center-tapped neutral terminal being connected to said second primary grounding connection via a shunting conductor, an improvement comprising a current balancing transformer (CBT) having a magnetic core and a first and a second independent winding wound thereon, said current balancing transformer being located between said primary power source and said distribution transformer, said first CBT winding having one end connected to said primary power source and its opposite end being connected to the primary winding of said distribution transformer, a said second CBT winding being directly connected to said primary power source at one end and having its opposite end connected to the primary winding of said distribution transformer.

2. A stray voltage protection circuit comprising at least one neutral grounded load center, a distribution transformer including a secondary winding having a neutral conductor positioned intermediate to the ends of said secondary winding and jointly connected to a secondary grounding connection of said load center and to a distribution transformer primary winding arranged for connection to a power source having a conductor connected to a primary grounding connection, said primary winding being arranged for connection with a primary grounding connection, and a current shunt conductor connected at one end to said primary winding grounding connection and with its opposite end connected to said neutral conductor, and a current balancing transformer (CBT) having a magnetic core with a first and a second winding mounted thereon, said first (CBT) winding having one end connected to said power source and having its opposite end connected to one end of the primary winding of said distribution transformer, one end of said second (CBT) winding being connected to said power source and having its opposite end being connected to the opposite end of said distribution transformer primary winding and jointly with said primary winding ground connection.

3. The stray voltage protection circuit of claim 2, wherein said first CBT winding is a relatively high voltage line winding and wherein said second CBT winding a neutral grounded winding.

4. The stray voltage protection circuit of claims 2 or 3, wherein each of said first and second CBT windings comprise magnet wire insulated with an insulating coating.

5. The stray voltage protection circuit of claim 2 wherein each of said first and second CBT windings are of 14 AWG magnet wire insulated with a polyvinyl formal coating not less than 0.0016 inches radially and comprise 150 turns when mounted on said magnetic core comprising grain-oriented silicon steel.

6. The stray voltage protection circuit of claim 3, wherein said high voltage CBT winding comprises a pre-selected length of conductive, metallic ribbon material wound on one leg of said magnetic core and having a width substantially coextensive with the length of said leg, and insulated sheet material deposited between the turns of said ribbon winding.

7. The stray voltage protection circuit of claim 3, wherein said neutral CBT winding has 28 turns of two No. 8 square AWG magnet wires and a polyvinyl formal coating not less than 0.0015 inches, and said high voltage CBT winding comprises 28 turns of 0.005 inch thick by 6.25 inches wide bare copper sheet and further having 0.007 inch thick kraft paper insulation between winding turns of said high voltage CBT winding.

8. A method of substantially eliminating stray voltage in an electrical load circuit comprising the steps of locating a current balancing transformer (CBT) between a primary power source and a step-down distribution transformer, said CBT including a magnetic core and a first and a second winding wound on the core; said distribution transformer including a primary winding, a magnetic core and a secondary winding, said secondary winding having a center-tapped neutral conductor connected thereto; connecting one end of said first CBT winding to a power source and connecting the opposite end thereof to one end of said primary winding; connecting an end of said second CBT winding to said power source and also to a first primary grounding connection; connecting the opposite end of said second CBT winding to the opposite end of said primary winding; connecting said second CBT winding, said opposite end of said primary winding and said center-tapped conductor to a second primary grounding connection; and connecting opposite ends of said secondary winding and said center-tapped terminal to a secondary grounded load center to be supplied by said power source and said step-down transformer.

* * * * *